(12) United States Patent
Hwang (10) Patent No.: US 7,576,891 B2
(45) Date of Patent: Aug. 18, 2009

(54) APPARATUS AND METHOD FOR IMPROVING IMAGE QUALITY OF IMAGE SENSOR

(75) Inventor: Sung-Hyun Hwang, Chungcheongbuk-do (KR)

(73) Assignee: Crosstek Capital, LLC, Wilmington, DE (US)

( * ) Notice: Subject to any disclaimer, the term of this patent is extended or adjusted under 35 U.S.C. 154(b) by 557 days.

(21) Appl. No.: 11/288,729

(22) Filed: Nov. 28, 2005

(65) Prior Publication Data

US 2007/0097391 A1 May 3, 2007

(30) Foreign Application Priority Data

Nov. 1, 2005 (KR) .................... 10-2005-0103737

(51) Int. Cl.
*G06F 15/00* (2006.01)
*G06T 5/00* (2006.01)
*H04N 1/38* (2006.01)

(52) U.S. Cl. .................. 358/1.9; 358/3.26; 358/3.27; 358/463

(58) Field of Classification Search .................. 358/1.9, 358/3.26, 3.27, 463; 348/241
See application file for complete search history.

(56) References Cited

U.S. PATENT DOCUMENTS

| 2003/0113013 A1* | 6/2003 | Hammadou .................. 382/166 |
| 2004/0252218 A1* | 12/2004 | Kovvuri et al. ......... 348/333.01 |
| 2005/0117036 A1* | 6/2005 | Nishi et al. ................. 348/241 |
| 2005/0275736 A1* | 12/2005 | Chiu et al. .................. 348/272 |

OTHER PUBLICATIONS

Edward M. Schwalb, ITV Handbook: Technologies and Standards, 2003, Prentice Hall PTR, pp. 530-531.*

* cited by examiner

*Primary Examiner*—King Y Poon
*Assistant Examiner*—Javier Segura
(74) *Attorney, Agent, or Firm*—Turocy & Watson LLP (57) ABSTRACT

Provided are an apparatus and method for improving an image quality of an image sensor, capable of adaptively removing noise occurring in a de-mosaicking that is performed for generating three-channel data of R, G and B from a single channel pixel structure based on a bayer pattern. The apparatus includes a first converting unit for converting RGB color data into a YCbCr color data, the RGB color data being obtained from bayer data through a de-mosaicking, a noise removal unit for removing noise from a Cb and a Cr color data outputted from the first converting unit, and a second converting unit for converting the Cb and the Cr color data from the noise removal unit and a Y data from the first converting unit into the RGB color data.

30 Claims, 7 Drawing Sheets
(4 of 7 Drawing Sheet(s) Filed in Color)

APPARATUS AND METHOD FOR IMPROVING IMAGE QUALITY OF IMAGE SENSOR

CROSS REFERENCE TO RELATED APPLICATION

The present application claims priority to and the benefit of Korean patent application No. KR 2005-103737, filed in the Korean Patent Office on Nov. 1, 2005, the entire content of which is incorporated herein by reference.

FIELD OF THE INVENTION

The present invention relates to a semiconductor technology; and, more particularly, to an apparatus and method for improving an image quality of an image sensor, such as a CMOS image sensor or a CCD, by removing a color noise.

DESCRIPTION OF THE RELATED ART

With the advance of Internet-based video communications, demands of digital cameras are explosively increasing. In addition, as mobile terminals with built-in camera, such as personal digital assistants (PDAs), international mobile telecommunications-2000 (IMT-2000) terminals, and code division multiple access (CDMA) terminals, are widely spread, demands of small-sized camera modules are increasing.

The camera module includes an image sensor as a basic element. The image sensor is a device to convert an optical image into an electric signal. As the image sensor, a complementary metal oxide semiconductor (CMOS) sensor and a charge coupled device (CCD) are widely used.

The CCD image sensor has a lot of disadvantages, such as a complex driving scheme, a high power consumption, a complex manufacturing process because of a large number of mask processes, a difficulty in implementing one chip because a signal processing circuit cannot be integrated inside a chip, and so on. On the contrary, the CMOS image sensor can achieve a monolithic integration of control/driving/signal processing circuits on a single chip. For these reasons, the CMOS image sensor draws great attraction. Further, compared with the CCD image sensor, the CMOS image sensor can be potentially manufactured at a low cost due to a low voltage operation, a low power consumption, a compatibility with peripheral devices, and utilization of standard CMOS fabrication process.

However, in the CMOS image sensor, analog signals generated from a light-receiving element, e.g., a photodiode, have various parasitic effects caused by a parasitic capacitance, a resistance, a dark current leakage, or a mismatched characteristic of semiconductor devices. These parasitic effects inevitably occur in the semiconductor device and degrade a signal to noise ratio of an image data. Accordingly, noise is an important factor to restrict performance of the CMOS image sensor.

A cause of noise occurring in the CMOS image sensor is a kT/C noise related to a sampling of image data, 1/f noise related to a circuit used for amplifying image signal, a fixed pattern noise (FPN) related to a mismatch with a signal process circuit of the image sensor, and so on. The FPN is very bad visually because it appears in form of a vertical line or strip and thus it can be easily recognized by humans' eyes.

The CMOS image sensor includes an image sensor processor (ISP) for processing an image. The IPS has been designed in various methods so as to enhance an image quality of the image sensor. One method is a de-mosaicking.

Figure 1:
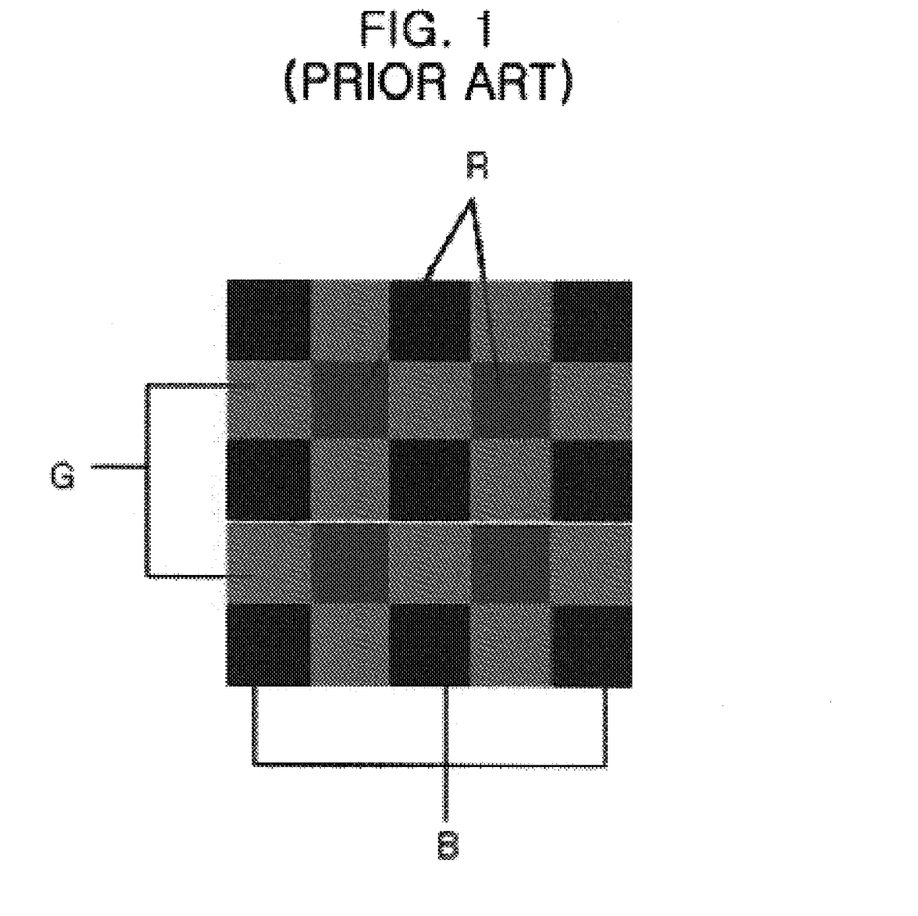
FIG. 1 is a diagram showing a conventional bayer pattern.

FIG. 1 is a diagram showing a bayer pattern.

As shown, each of pixels stores information on a single color alone. Therefore, in order to obtain information on the other two colors, all image sensors adopting the bayer pattern generate estimated values with respect to colors of the image using information on adjacent different colors. At this point, a de-mosaicking is demanded.

The de-mosaicking is one of data interpolation methods. The simplest de-mosaicking is a zero-th order interpolation that uses color information of adjacent pixels without any modification. In addition, a linear interpolation uses all information on adjacent different colors, and an adaptive interpolation adaptively calculates values by assigning weight to adjacent pixels. However, due to the fundamental limitation of the bayer pattern, the de-mosaicking causes color noise.

Figure 2A:
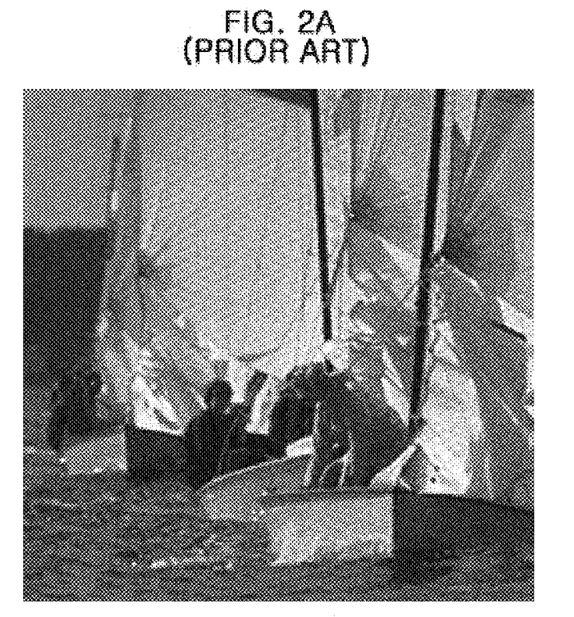
FIG. 2A is a diagram depicting an original color image.
Figure 2B:
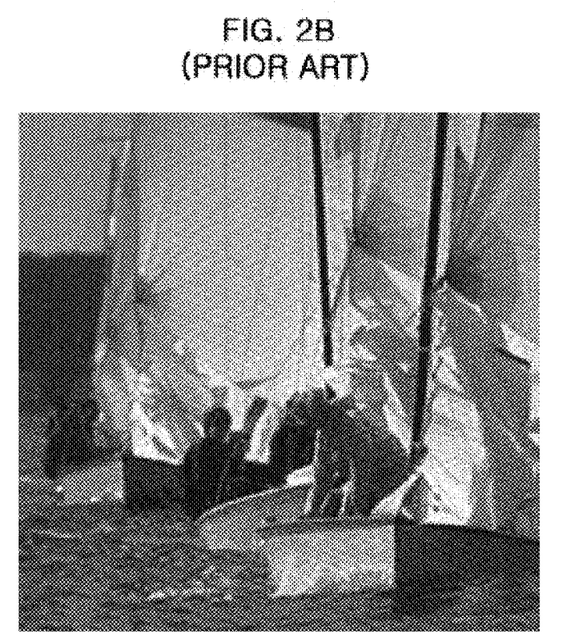
FIG. 2B is a diagram depicting a resultant image given when a de-mosaicking is applied to the original color image of FIG. 2A.

FIG. 2A is a diagram depicting an original color image and FIG. 2B is a diagram depicting a resultant image given when a de-mosaicking, specifically a linear interpolation, is applied to the original color image of FIG. 2A.

As can be seen from FIG. 2B, color noise that does not exist in the original color image of FIG. 2A appears at boundaries of objects in the image.

SUMMARY OF THE INVENTION

It is, therefore, an object of the present invention to provide an apparatus and method for improving an image quality of an image sensor, capable of adaptively removing color noise occurring in a de-mosaicking that is performed for generating three-channel data of R, G and B from a single channel pixel structure based on a bayer pattern.

In accordance with an aspect of the present invention, there is provided an apparatus for improving an image quality of an image sensor including: a first converting unit for converting a RGB color data obtained from bayer data through a de-mosaicking into a YCbCr color data; a noise removal unit for removing a noise of a Cb and a Cr color data outputted from the first converting unit based on a reference determined by the Cb and the Cr color data; and a second converting unit for converting Cb and Cr color data outputted from the noise removal unit and a Y color data from the first converting unit into the RGB color data.

In accordance with another aspect of the present invention, there is provided a method for improving an image quality of an image sensor, the method including the steps of: converting a RGB color data into a YCbCr color data, the RGB color data being obtained from bayer pattern through a de-mosaicking; removing a noise from a Cb and a Cr color data among the data converted into the YCbCr color data; and converting the Cb and the Cr color data outputted from the noise removal unit and Y data into the RGB color data.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects and features of the present invention will become apparent from the following description of the preferred embodiments given in conjunction with the accompanying drawings, in which.

DETAILED DESCRIPTION OF THE INVENTION

An apparatus and method for improving an image quality of an image sensor in accordance with exemplary embodiments of the present invention will be described in detail with reference to the accompanying drawings.

Figure 3:
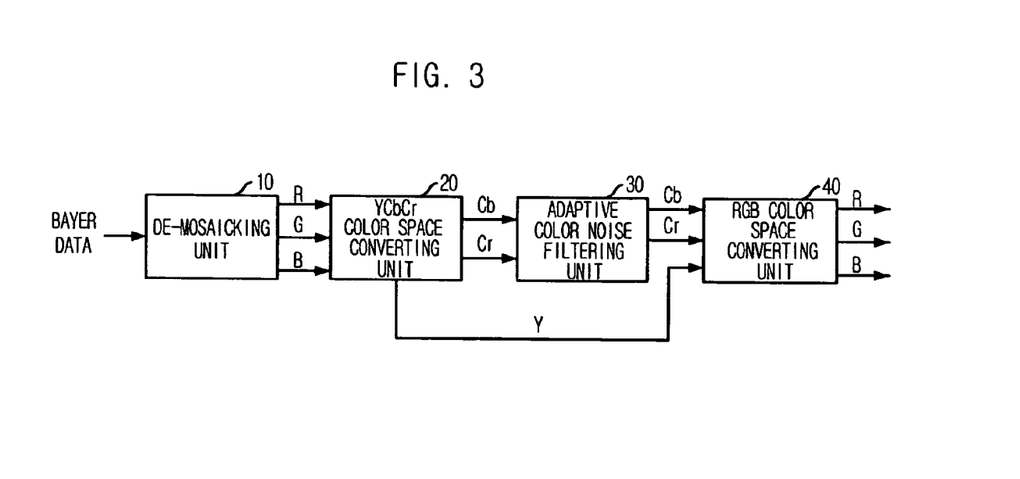
FIG. 3 is a block diagram showing an apparatus for improving an image quality of an image sensor in accordance with an embodiment of the present invention.

FIG. 3 is a block diagram showing an apparatus for improving an image quality of an image sensor in accordance with an embodiment of the present invention.

As shown, the apparatus in accordance with the embodiment of the present invention includes a de-mosaicking unit 10, an YCbCr color space converting unit 20, an adaptive color noise filtering unit 30, and an RGB color space converting unit 40.

The de-mosaicking unit 10 obtains RGB color images from a bayer through a de-mosaicking. The YCbCr color space converting unit 20 converts the RGB color images into YCbCr color space. The adaptive color noise filtering unit 30 independently performs a smoothing process according to Cb data and Cr data outputted from the YCbCr color space converting unit 20 to remove a color noise. The RGB color space converting unit 40 converts the Cb data and the Cr data from the adaptive color noise filtering unit 30 and Y data from the YCbCr color space converting unit 20 into a RGB color space.

The YCbCr color space converting unit 20 converts the RGB color images into the YCbCr color space using a matrix-vector product given by $$\begin{bmatrix} Y \\ Cb \\ Cr \end{bmatrix} = \begin{bmatrix} 0.299 & 0.587 & 0.114 \\ -0.169 & -0.331 & 0.5 \\ 0.5 & -0.419 & -0.081 \end{bmatrix} \begin{bmatrix} R \\ G \\ B \end{bmatrix} + \begin{bmatrix} 0 \\ 128 \\ 128 \end{bmatrix} \quad (1)$$

Since the Cb data and the Cr data obtained by Eq. (1) contain most of color information, they are adapted for removing color noise that may be caused during the de-mosaicking.

The adaptive color noise filtering unit 30 uses an adaptive smoothing to independently perform a smoothing with respect to the Cb data and the Cr data outputted from the YCbCr color space converting unit 20. The adaptive smoothing means that the smoothing is differently applied depending on areas. For example, in case where edges or boundaries exist in kernels in which the Cb data and Cr data are stored, if an average value is extracted by simply averaging components contained in all kernels, boundaries are blurred.

Accordingly, a threshold value to be used during a filtering process is determined using an input value of a middle position from input data. Then, the smoothing is performed using the determined threshold value. This method is called the adaptive smoothing.

The adaptive smoothing will be described below with reference to FIG. 6. It will be assumed that a kernel size is 9 and data are sequentially inputted within the kernel.

Figure 6:
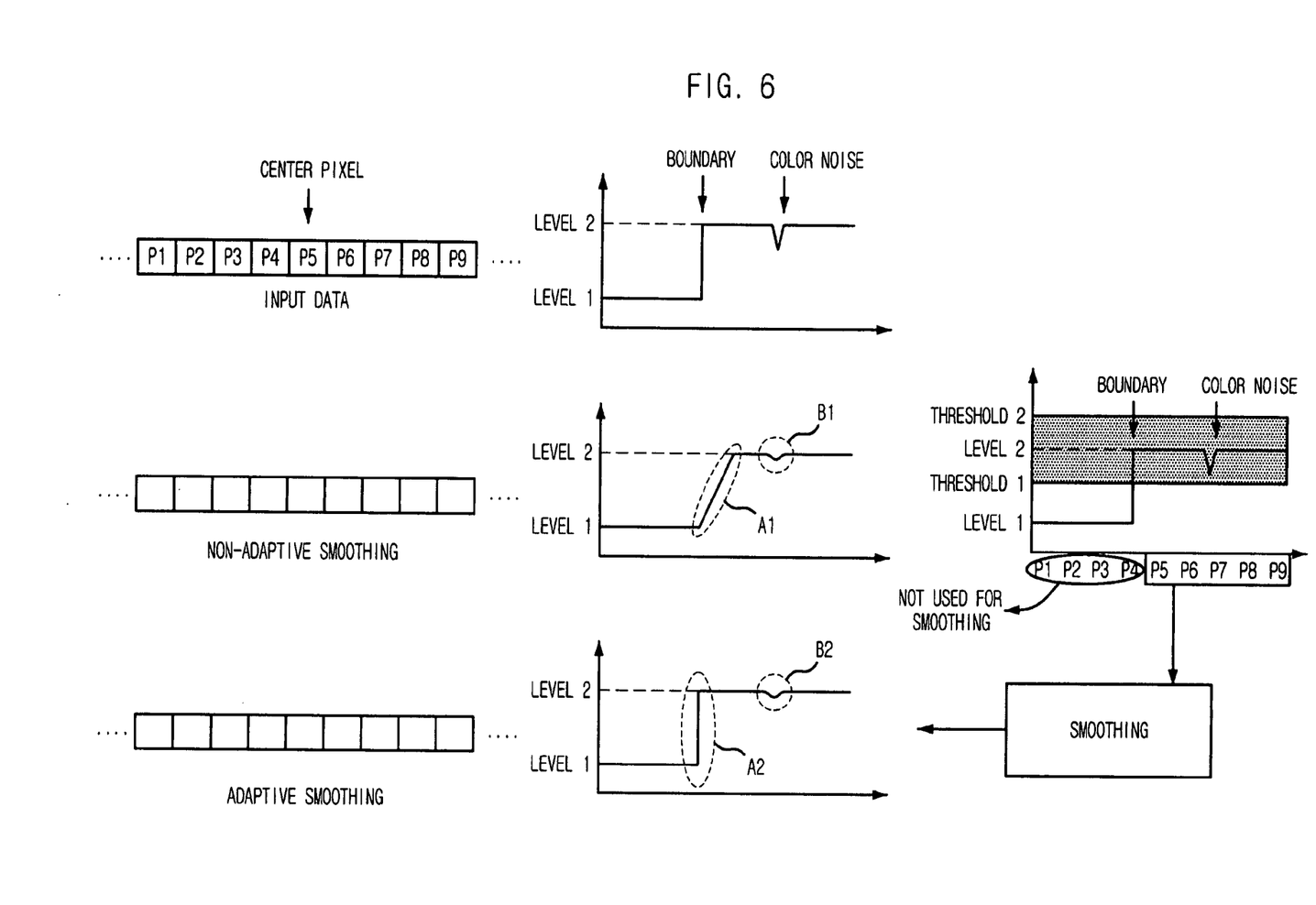
FIG. 6 is a diagram for explaining an operational characteristic of an YCbCr color space converter illustrated in FIG. 3.

Referring to FIG. 6, a pixel P5 represent a pixel disposed at the center from the input data and an adaptive smoothing is performed on pixels adjacent to the center pixel P5. If a non-adaptive smoothing is performed without setting the center pixel, some of color noise can be removed as indicated by 'B1', but a boundary region is blurred as indicated by 'A1'. Therefore, a device characteristic is badly affected. That is, color blurring phenomenon occurs in the color boundary region as indicated by 'A1'.

In order to prevent the color blurring phenomenon occurring at the boundary region when applying the non-adaptive smoothing, only adjacent pixels disposed within a predetermined range which is determined by a threshold value centering on the center pixel P5 are smoothed. Therefore, a blurring phenomenon of brightness level is removed as indicated by 'A2', and noise is removed as indicated by 'B2'. The predetermined range is determined by threshold values Threshold1 and Threshold2. Consequently, the adaptive smoothing is performed on the boundary regions by smoothing only similar values to the value of the center pixel among the input pixels.

As described above, the adaptive color noise filtering unit 30 uses a one-dimensional filter to independently perform the adaptive smoothing on the Cb data and the Cr data. The one-dimensional filter can exclude the use of a memory in hardware implementation. Meanwhile, the adaptive color noise filtering noise 30 is not limited to the one-dimensional filter, but can also use a two-dimensional filter when a spatial resource is sufficient.

Figure 4:
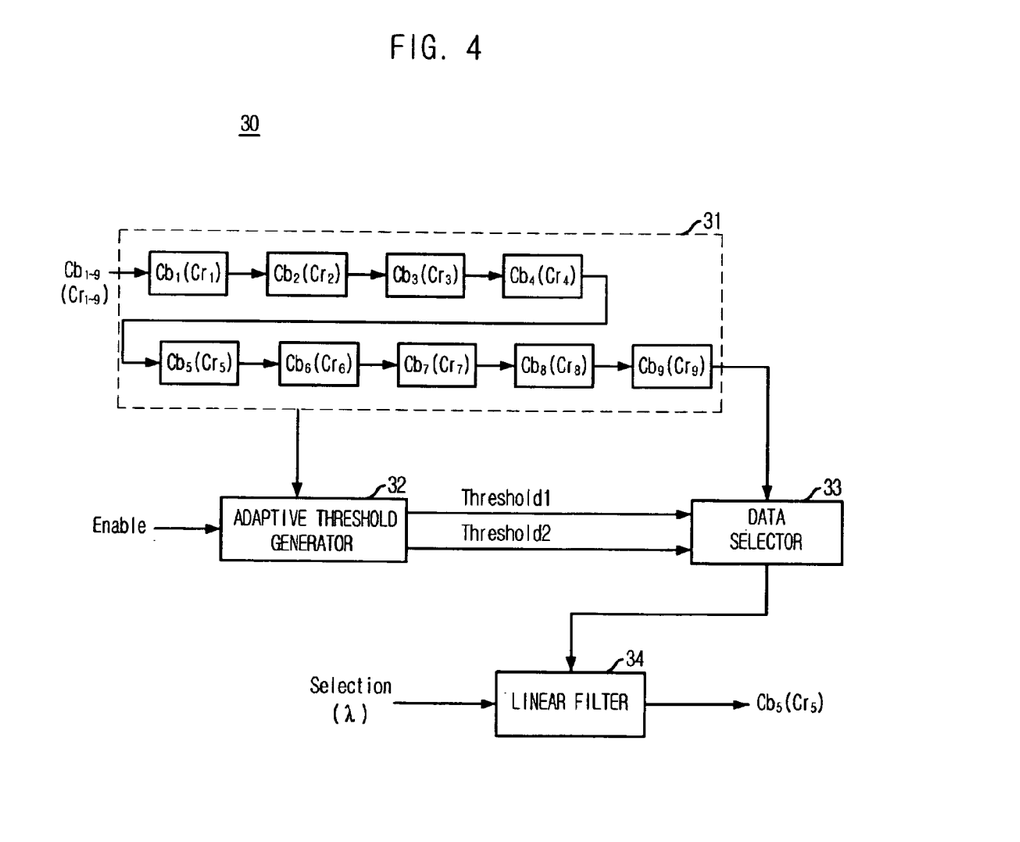
FIG. 4 is a block diagram showing an adaptive color noise filter illustrated in FIG. 3.

Hereinafter, a structure of the one-dimensional filter will be described with reference to FIG. 4 as one example for convenience.

As shown, the one-dimensional filter includes a register 31, an adaptive threshold generator 32, a data selector 33, and a linear filter 34.

The register 31 sequentially stores the Cb data and Cr data outputted from the YCbCr color space converting unit 20. The adaptive threshold generator 32 determines a threshold value used during the filtering process by using a data disposed at the center of the data stored in the register 31. The data selector 33 selects the output data of the register 31 by using the threshold values Threshold1 and Threshold 2 outputted from the adaptive threshold generator 32. The linear filter 34 smoothes the selected data according to a select signal Selection.

The register 31 sequentially receives the Cb data or the Cr data and stores them in a pipeline form. That is, since each value of the pixels obtained from the image sensor is transmitted in real time in a pipeline form, (N+1) number of data has to be stored in the respective registers during the smoothing by using N number of pixels adjacent to the center pixel. For example, nine data are stored in the respective registers during the smoothing by using eight pixels centering on the center pixel. In addition, the number of the adjacent pixels can be expanded or reduced.

The adaptive threshold generator 32 operates in response to an enable signal Enable and determines the threshold value used during the filtering process by using the input value of the data disposed at the center among the (N+1) number, e.g., nine, of data stored in the register 31. Under the assumption that a statistical characteristic of noise added to the adjacent pixels follows a Gaussian distribution, a minimum threshold value is equal to 'P5−3×σ' and a maximum threshold value is equal to 'P5+3×σ' with respect to a standard deviation (σ) obtained by calculating deviations of the pixels. These equations are derived from the characteristic that 99% of the probability that there can be noise in the Gaussian distribution exists within ±3σ from the average value. The final threshold value can be calculated as Eq. (2) below by referring to phase structure of the nine stored pixel values and considering the case that magnitude distribution of pixels has a step function.

$$Th = \min\{3\sigma, \frac{1}{2}(\min\{Cb(n)\} + \max\{Cb(n)\})\} \quad (2)$$
$$Th1 = P5 - Th$$
$$Th2 = P5 + Th$$

The data selector 33 selects the data sequentially inputted from the register 31 by using the threshold values Threshold1 and Threshold2 determined by the adaptive threshold generator 32.

In Eq. (2), the elements P1 to P9 represent the pixels stored in the register 31, min{} calculates the minimum value within the set, and max{} calculates the maximum value within the set. In order not to affect the different brightness levels, a minimum value among 3σ, half of the average of the minimum value and the maximum value is determined as the minimum value. The threshold values Threshold1 and Threshold2 are calculated from Eq. (2).

As illustrated in FIG. 6, the data sequentially inputted from the register 31 are compared centering on the threshold values Threshold1 and Threshold2, and a second order input value to be used during the smoothing is selected. A Gaussian weight can be assigned to the selected data, centering on the center pixel. Also, the smoothing can be performed through a simple unit weight. The other data are not used as the second order input value. For example, in FIG. 6, the selected data are P5 to P9, and the unselected data are P1 to P4.

The linear filter 34 performs the smoothing on the data selected by the data selector 33. An example of the linear filter is illustrated in FIG. 5.

Figure 5:
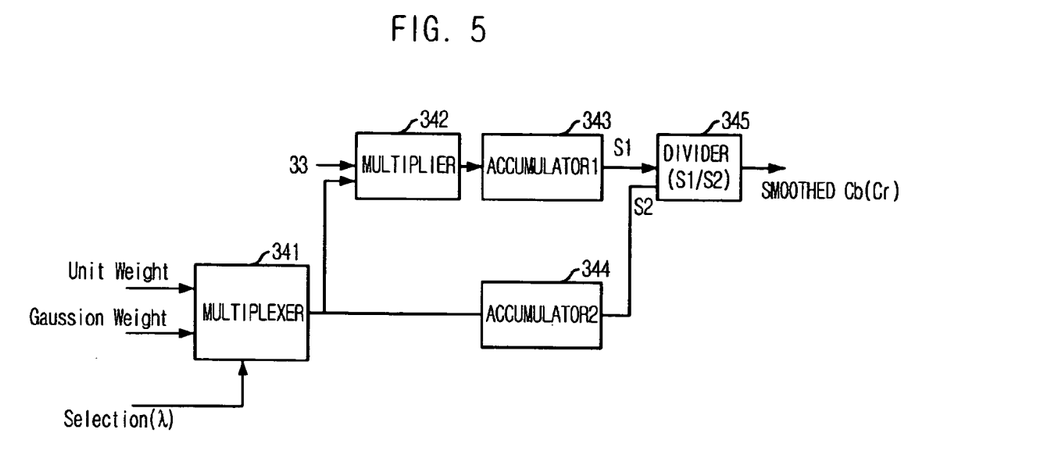
FIG. 5 is a block diagram showing a linear filtering unit illustrated in FIG. 4.

Referring to FIG. 5, the linear filter 34 includes a multiplexer 341 for selecting a smoothing weight in response to the select signal Selection, a multiplier 342 for multiplying the selected weight by the data selected by the data selector 33, a first accumulator 343 for sequentially summing the data outputted from the multiplier 342, a second accumulator 344 for sequentially summing the weights selected by the multiplexer 341, and a divider 345 for dividing the output data S1 of the first accumulator 343 by the output data S2 of the second accumulator 344 for normalization.

The multiplexer 341 selects the Gaussian weight or a unit weight in response to the select signal Selection. Here, the unit weight is a weight for an arithmetic average. For example, when the select signal Selection (λ) is '0', the unit weight is selected. When the select signal Selection (λ) is '1', the Gaussian weight is selected. The select signal Selection (λ) is determined by the user.

The multiplier 342 multiplies the selected weight from the multiplexer 341 by the sequentially inputted data from the data selector 33. For example, when the unit weight is selected by the multiplexer 341, the respective data sequentially inputted from the data selector 33 are multiplied by '1'. When the Gaussian weight is selected, the respective data are multiplied by the Gaussian weight.

The first accumulator 343 sequentially sums the values outputted from the multiplier 342.

The second accumulator 344 sequentially sums the weights outputted from the multiplexer 341.

The divider 345 divides the output data S1 of the first accumulator 343 by the output data S2 of the second accumulator 344 for normalization, and outputs normalized data, for example, the Cb data or the Cr data.

A relationship between the final user input and the smoothing is expressed as $$P'_5 = (1-\lambda)\frac{1}{C}\sum_{n=1}^{N}P(n)\times\exp\left(-\frac{(K(n)-5)^2}{2\times 1.8^2}\right) + \frac{\lambda}{N}\sum_{n=1}^{N}P(n) \quad (3)$$

In Eq. (3), when the Gaussian weight is assigned according to the user input, λ is set to '1'. On the contrary, when the simple arithmetic average is used, λ is set to '0'. In addition, P(n) represents the input data obtained in a previous stage, where n is the total number of the input data existing within a range of the threshold value. In Eq. (3), 'C' in the first term of the right side is expressed as Eq. (4) below and is a constant for conservation of total energy of the inputted data. K(n) represents the position occupied in the input data of the original nine pixels by an n-th pixel value among N number of the selected input data. For example, if n=2 and the position of the pixel is originally 3, K(2) is equal to 3.

$$C = \sum_{n=1}^{N}\exp\left(-\frac{(K(n)-5)^2}{2\times 1.8^2}\right) \quad (4)$$

By performing the smoothing on all the input pixels, the noiseless Cb or Cr data, i.e., smoothed Cb or Cr data, can be obtained.

The RGB color space converting unit 40 converts the Cb and Cr data, i.e., smoothed Cb or Cr data, from the adaptive color noise filtering unit 30 and the Y data from the YCbCr color space converting unit 20 into the RGB color space. That is, the RGB color space converting unit 40 converts the YCbCr data into the RGB color. An exemplary converting method using a matrix-vector product is expressed as $$\begin{bmatrix}R\\G\\B\end{bmatrix} = \begin{bmatrix}1.402 & 1 & 0\\-0.714 & 1 & -0.344\\0 & 1 & 1.772\end{bmatrix}\begin{bmatrix}Cr-128\\Y\\Cb-128\end{bmatrix} \quad (5)$$

FIGS. 7A to 7D are diagrams of resultant images when the apparatus of the present invention is applied.

Figure 7A:
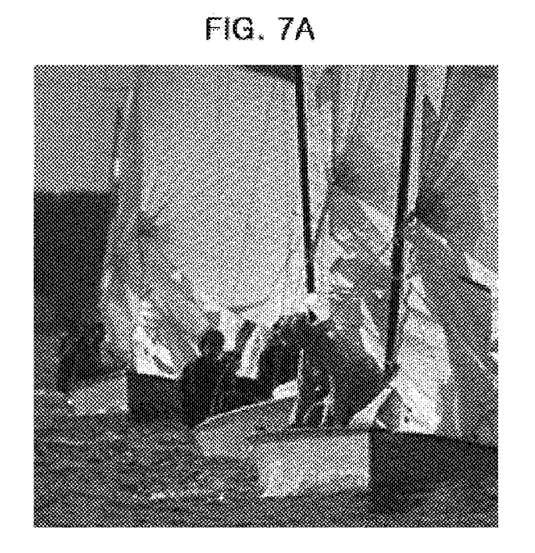
FIG. 7A is a diagram depicting an original color image.
Figure 7B:
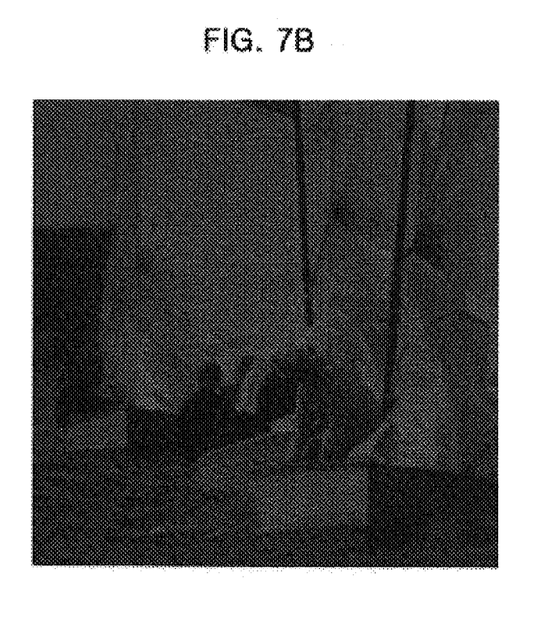
FIG. 7B is a diagram depicting a bayer pattern of the original color image of FIG. 7A.
Figure 7C:
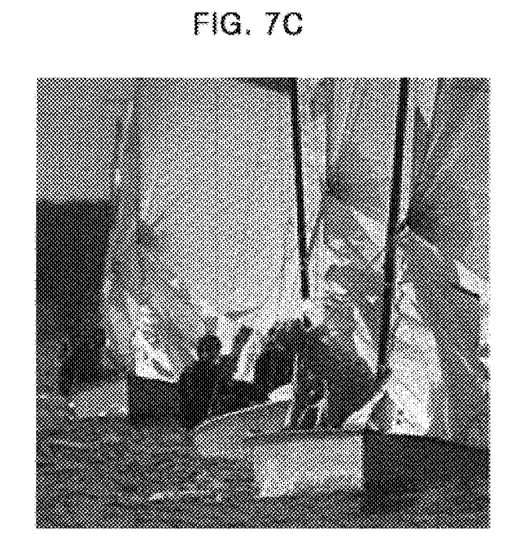
FIG. 7C is a diagram depicting a resultant image given when a de-mosaicking is applied to the bayer pattern of FIG. 7B.
Figure 7D:
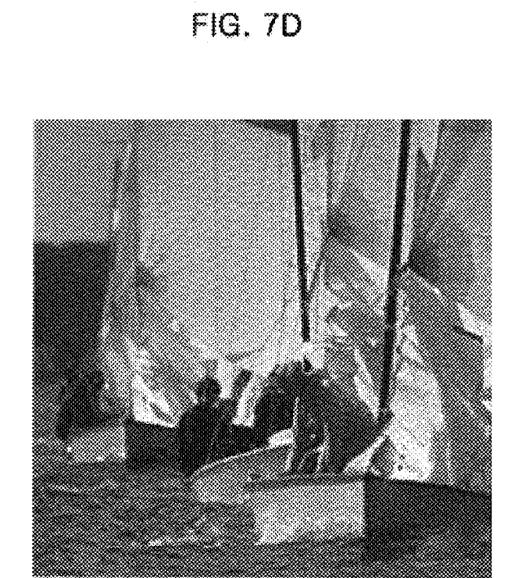
FIG. 7D is a diagram depicting an image given when a color noise is removed from the image of FIG. 7C in accordance with an embodiment of the present invention.

Specifically, FIG. 7A is a diagram of an original color image, FIG. 7B is a diagram of a bayer pattern of the original color image of FIG. 7A, FIG. 7C is a diagram of a resultant image given when a de-mosaicking is applied to the bayer pattern of FIG. 7B, and FIG. 7D is a diagram of an image given when a color noise is removed from the image of FIG. 7C in accordance with an embodiment of the present invention.

As described above, the more improved quality of image can be provided by adaptively smoothing the color noise generated when the de-mosaicking is applied to the bayer pattern.

Also, by smoothing the divided channels, the signal to noise ratio is enhanced and thus the image sensor adopting the bayer pattern can provide good image quality.

In addition, according to the object and application, a video tracking technology can enhance its recognition and tracking accuracy.

Further, a mobile image sensor can provide an improved image, thus meeting user's higher demand.

While the present invention has been described with respect to the particular embodiments, it will be apparent to those skilled in the art that various changes and modifications may be made without departing from the scope of the invention as defined in the following claims.

What is claimed is:

1. An apparatus for improving an image quality of an image sensor, the apparatus comprising:
    a first converting unit for converting an RGB color data obtained from bayer data through a de-mosaicking into a YCbCr color data;
    a noise removal unit for removing a noise of a Cb and a Cr color data outputted from the first converting unit, and for determining a threshold value to be used during a filtering process by using data located at a center from the Cb and the Cr color data outputted from the first converting unit; and
    a second converting unit for converting Cb and Cr color data outputted from the noise removal unit, and a Y color data from the first converting unit, into the RGB color data,
    wherein when a statistical characteristic of noise added to adjacent pixels follows a Gaussian distribution, a minimum threshold value is equal to 'P5−3×σ' and a maximum threshold value is equal to 'P5+3×σ' with respect to a standard deviation (σ) obtained by calculating deviations of the pixels, where P5 represents a data value of a pixel disposed at the center.

2. The apparatus as recited in claim 1, wherein the first converting unit converts the RGB color data into the YCbCr color data using a matrix-vector product.

3. The apparatus as recited in claim 1, wherein the Cb and the Cr color data outputted from the first converting unit include color information.

4. The apparatus as recited in claim 1, wherein the filtering is performed by a one-dimensional filter that includes:
    a register for sequentially storing the Cb and the Cr color data outputted from the first converting unit;
    a threshold generator for determining the threshold value to be used during the filtering process by using the data located at the center among the Cb and the Cr color data stored in the register;
    a data selector for selecting the output data of the register using the threshold value outputted from the threshold generator; and
    a linear filter for removing a noise from the data selected by the data selector.

5. The apparatus as recited in claim 4, wherein the register sequentially receives the Cb and the Cr color data from the first converting unit to output the Cb and the Cr color data in a pipeline form.

6. The apparatus as recited in claim 5, wherein the threshold generator operates in response to an enable signal and determines the threshold value to be used during the filtering process by using an input value of the data positioned at the center among the Cb and the Cr color data stored in the register.

7. The apparatus as recited in claim 1, wherein the threshold generator calculates the threshold value using a following equation $$Th = \min\left\{3\sigma, \frac{1}{2}(\min\{Cb(n)\} + \max\{Cb(n)\})\right\}$$

$$Th1 = P5 - Th$$

$$Th2 = P5 + Th,$$

where elements of Cb(n) represent the pixels stored in the register, min{} calculates a minimum value within the set, max{} calculates a maximum value within the set, the threshold value is determined by a minimum value among 3σ, and half of the average of the minimum value and the maximum value.

8. The apparatus as recited in claim 4, wherein the data selector selects the data sequentially inputted from the register by using the threshold value determined by the threshold generator.

9. The apparatus as recited in claim 4, wherein the linear filter includes:
    a multiplexer for selecting a weight for smoothing with respect to the data selected by the data selector in response to a select signal;
    a multiplier for multiplying the selected weight by the data selected through the data selector;
    a first accumulator for sequentially adding data outputted from the multiplier;
    a second accumulator for sequentially adding the weights selected by the multiplexer; and
    a divider for dividing the output data of the first accumulator by output data of the second accumulator for normalization.

10. The apparatus as recited in claim 9, wherein the multiplexer selects a Gaussian weight or a unit weight according to the select signal.

11. The apparatus as recited in claim 10, wherein the unit weight is a weight for an arithmetic average.

12. The apparatus as recited in claim 9, wherein the select signal is inputted from a source external to the image sensor.

13. The apparatus as recited in claim 9, wherein the multiplier multiplies the weight selected by the multiplexer by the data selected by the data selector to be sequentially inputted.

14. The apparatus as recited in claim 9, wherein the linear filter performs the smoothing on the data sequentially outputted from the data selector by using a following equation $$P_5' = (1-\lambda)\frac{1}{C}\sum_{n=1}^{N} P(n) \times \exp\left(-\frac{(K(n)-5)^2}{2 \times 1.8^2}\right) + \frac{\lambda}{N}\sum_{n=1}^{N} P(n)$$

$$C = \sum_{n=1}^{N} \exp\left(-\frac{(K(n)-5)^2}{2 \times 1.8^2}\right),$$

where P(n) represents input data obtained in a previous stage, n is the total number of the input data existing within a range of the threshold, and K(n) represents a position occupied in input data of the original nine pixels by an n-th pixel value among N number of the selected input data, wherein, when the Gaussian weight is assigned, λ is set to '1' and when the simple arithmetic average is used, λ is set to '0'.

15. A method for improving an image quality of an image sensor, the method comprising:

converting an RGB color data into a YCbCr color data, the RGB color data being obtained from a bayer pattern through a de-mosaicking;

removing a noise from a Cb and a Cr color data among the data converted into the YCbCr color data and determining a threshold value to be used during a filtering process by using data located at a center from the Cb and the Cr color data; and converting, the Cb and the Cr color data outputted after the removing the noise from the Cb and the Cr color data, and Y data, into the RGB color data, wherein when a statistical characteristic of noise added to adjacent pixels follows a Gaussian distribution, a minimum threshold value is equal to 'P5−3×σ' and a maximum threshold value is equal to 'P5+3×σ' with respect to a standard deviation (σ) obtained by calculating deviations of the pixels, where P5 represents a data value of the pixel disposed at the center.

16. The method as recited in claim 15, wherein the RGB color data is converted into the YCbCr color data using a matrix-vector product.

17. The method as recited in claim 15, wherein the Cb and the Cr color data converted into the YCbCr color data include color information.

18. The method as recited in claim 16, wherein the removing of the noise further comprises:

performing a smoothing using the determined threshold value.

19. The method as recited in claim 15, wherein the removing of the noise is performed using a one-dimensional filter or a two-dimensional filter.

20. The method as recited in claim 15, wherein the removing of the noise from the Cb and the Cr color data includes:

storing the Cb and the Cr color data sequentially in a register;

determining the threshold value to be used during the filtering process by using the data located at the center among the data stored in the register;

selecting the data stored in the register using the threshold value; and removing noise from the selected data.

21. The method as recited in claim 20, wherein the Cb and the Cr color data are stored and outputted in a pipeline form.

22. The method as recited in claim 20, wherein the determining of the threshold is achieved by determining the threshold to be used during the filtering process by using an input value of the data positioned at the center among the data stored in the register.

23. The method as recited in claim 15, wherein the threshold is calculated using a following equation $$Th = \min\{3\sigma, \frac{1}{2}(\min\{Cb(n)\} + \max\{Cb(n)\})\}$$

$$Th1 = P5 - Th$$

$$Th2 = P5 + Th,$$

where elements of Cb(n) represent the pixels stored in the register, min{} calculates a minimum value within the set, max{} calculates a maximum value within the set, the threshold value is determined by a minimum value among 3σ, and half of the average of the minimum value and the maximum value.

24. The method as recited in claim 20, wherein the selecting of the data stored in the register is achieved by selecting the data sequentially inputted from the register by using the threshold value.

25. The method as recited in claim 20, wherein the removing of the noise from the selected data includes:

selecting a weight for smoothing with respect to the selected data in response to a select signal;

multiplying the selected weight by the selected data;

summing sequentially the multiplied data;

summing sequentially the selected weights; and dividing the sequentially summed multiplied data by the sequentially summed weight, and quantifying the sequentially summed multiplied data.

26. The method as recited in claim 25, wherein the selected weight is a Gaussian weight or a unit weight.

27. The method as recited in claim 26, wherein the unit weight is a weight for an arithmetic average.

28. The method as recited in claim 25, wherein the select signal is inputted from an external.

29. The method as recited in claim 25, wherein the multiplying of the selected weight by the selected data is achieved by sequentially multiplying the selected weight by the selected data one by one.

30. The method as recited in claim 25, wherein the removing of the noise from the selected data includes performing the smoothing on the selected data by using a following equation $$P_5' = (1-\lambda)\frac{1}{C}\sum_{n=1}^{N} P(n) \times \exp\left(-\frac{(K(n)-5)^2}{2 \times 1.8^2}\right) + \frac{\lambda}{N}\sum_{n=1}^{N} P(n)$$

$$C = \sum_{n=1}^{N} \exp\left(-\frac{(K(n)-5)^2}{2 \times 1.8^2}\right),$$

where P(n) represents input data obtained in a previous stage, n is the total number of the input data existing within a range of the threshold, and K(n) represents a position occupied in input data of the original nine pixels by an n-th pixel value among N number of the selected input data, wherein, when the Gaussian weight is assigned, λ is set to '1', when the simple arithmetic average is used, λ is set to '0'.

* * * * *

UNITED STATES PATENT AND TRADEMARK OFFICE
CERTIFICATE OF CORRECTION

PATENT NO.        : 7,576,891 B2                              Page 1 of 1
APPLICATION NO. : 11/288729
DATED             : August 18, 2009
INVENTOR(S)       : Sung-Hyun Hwang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this

Fourteenth Day of December, 2010

David J. Kappos
*Director of the United States Patent and Trademark Office*